United States Patent [19]

Skilliter, Jr. et al.

[11] 3,964,612
[45] June 22, 1976

[54] EQUIPMENT SUPPORT ASSEMBLY

[75] Inventors: Robert T. Skilliter, Jr.; Anthony P. Pietrowski, both of Genoa, Ohio

[73] Assignee: Acme Specialty Manufacturing Company, Toledo, Ohio

[22] Filed: Jan. 27, 1975

[21] Appl. No.: 544,373

[52] U.S. Cl. ............................. 211/26; 224/42.42 R; 248/13; 248/309 R
[51] Int. Cl.² ...................... B60R 7/04; B60R 7/00; B60R 11/02
[58] Field of Search .............. 248/309, 13, 23, 172; 211/26, 182; 312/7 R; 206/19.5 R, 19.5 B; 224/42.42 R, 42.45 R

[56] References Cited
UNITED STATES PATENTS

| 1,426,327 | 8/1922 | Tiffany | 248/13 UX |
| 2,305,763 | 12/1942 | Dietrich | 248/13 X |
| 2,839,745 | 6/1958 | Pyle | 248/172 X |
| 3,550,001 | 12/1970 | Hanley | 325/15 |
| 3,589,577 | 6/1971 | Basinger | 224/42.42 R |
| 3,650,444 | 3/1972 | Gibson | 224/42.42 R |
| 3,658,219 | 4/1972 | Ordt | 224/42.42 R |
| 3,685,708 | 8/1972 | Herrington | 248/23 X |
| 3,827,772 | 8/1974 | Johnson | 312/7 R |

Primary Examiner—J. Franklin Foss
Attorney, Agent, or Firm—Richard D. Emch

[57] ABSTRACT

The disclosure relates to an equipment support assembly which mounts communications equipment in vehicles. A post extends upwardly from a mounting bracket. A deck assembly is connected adjacent the upper end of the post. The deck assembly includes a plurality of holder units which are in vertical juxtaposition. Each holder unit mounts an individual piece of communications equipment or the like, for example, a radar unit. The holder unit includes U-shaped assemblies which are adjustable both laterally and vertically to receive equipment of differing sizes.

11 Claims, 5 Drawing Figures

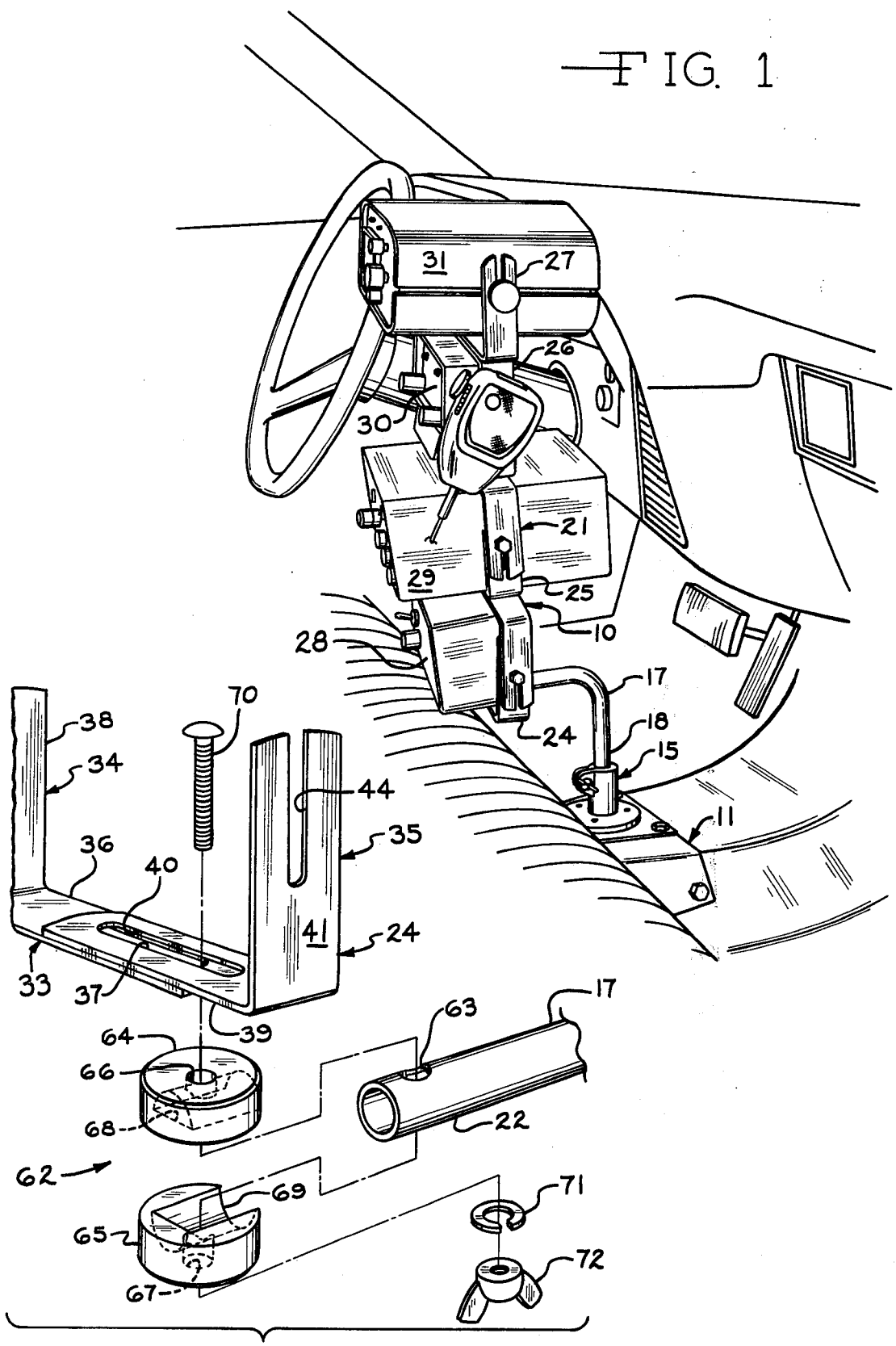

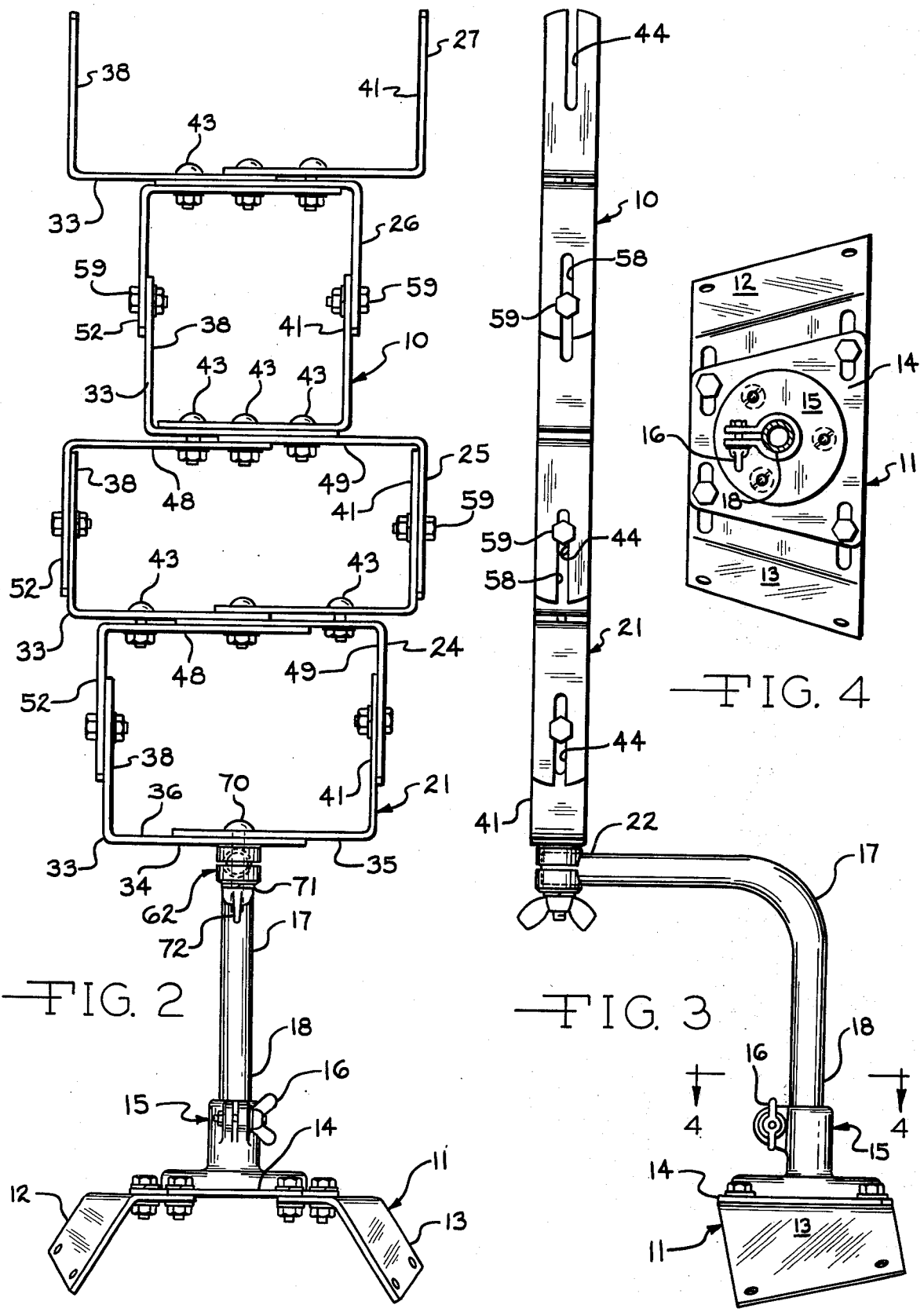

EQUIPMENT SUPPORT ASSEMBLY

BACKGROUND OF THE INVENTION

Modern-day emergency vehicles, for example police cars, include many types of communications equipment units. For examples, these include two-way radios, speaker/amplifier units, electronic sirens and speed detecting devices such as radar or vascar units. Many times these same vehicles are used by different police crews and, unless there is some uniformity of equipment, each team of policemen must learn the position of the various pieces of communications equipment in that particular police car. In addition, the same police car is often used for both one-man and two-man police patrols.

Various types of installation procedures have been utilized in the past, however, many of these were unsatisfactory because of the expenses involved, the safety factors involved and the nonuniformity of equipment in the various emergency vehicle units.

SUMMARY OF THE INVENTION

The present invention relates to an equipment support assembly which is suitable for mounting at one central location which is convenient to the vehicle driver for safe operation. It is not necessary for the operator to disconnect a safety belt, for example, in order to reach a particular piece of communications equipment. Furthermore, the equipment support assembly, according to the present invention, imposes a consistent or uniform communications system in all vehicles of a municipality whereby men and vehicles may be readily interchanged while still maintaining complete familiarity with the positioning of the various communications equipment units.

The equipment support assembly, according to the present invention, includes a mounting bracket which is mounted on the center floor of a vehicle. A post is connected to the mounting bracket and a deck assembly is connected on the upper end of the post. The deck assembly includes a plurality of holder units which are positioned in vertical juxtaposition. Each of the holder units includes a generally U-shaped base assembly having spaced arms which are laterally adjustable. In addition, the holder units, except for the uppermost unit, includes a generally U-shaped top assembly having spaced depending legs which overlie the spaced vertical arms of the base assembly and which are also laterally adjustable. The base assembly and the top assembly of each holder unit are vertically adjustable. By having both lateral and vertical adjustments, the holder assemblies can receive and mount individual equipment units of various sizes.

BRIEF DESCRIPTION OF THE DRAWINGS

FIG. 1 is a perspective view of an equipment support assembly, according to the present invention, mounted in a police car;

FIG. 2 is a front elevational view of the equipment support assembly shown in FIG. 1, taken on an enlarged scale;

FIG. 3 is a side elevational view of the equipment support assembly shown in FIG. 2;

FIG. 4 is a sectional view of the mounting bracket, taken along the line 4—4 of FIG. 3; and FIG. 5 is an exploded view showing a joint assembly which is utilized to connect the deck assembly to the upper end of the post.

DESCRIPTION OF THE PREFERRED EMBODIMENT

An equipment support assembly, according to the present invention, is generally indicated in FIG. 1 by the reference number 10. The equipment support assembly 10 includes a mounting bracket assembly 11 which is bolted or otherwise connected to the floor of the vehicle. In the embodiment shown in FIG. 1, the mounting bracket assembly 11 is mounted over the drive train housing. The mounting bracket assembly 11 includes two adjustable angle wings 12 and 13 which are bolted to a platform 14. A socket assembly 15 is connected to the platform 14. The socket assembly 15 includes a bolt and nut assembly 16.

An angled tubular post 17 has a lowermost end 18 which is received by the socket assembly 15. The post 17 may be rotated thereby changing the position of the entire support assembly 10 by loosening and tightening the bolt and nut assembly 16. A deck assembly 21 is mounted adjacent an upper or second end 22 of the post 17.

Referring specifically to FIG. 2, the deck assembly 21 includes a plurality of holder units 24, 25, 26 and 27 which are arranged in vertical juxtaposition. Referring to FIG. 1, the individual holder units 24-27 mount, for examples, communication units which comprise a siren unit 28, radio communication units 29, 30 and a vascar unit 31. Of course, many types of equipment units are suitable for being supported by the individual holder units 24-27 of the equipment support assembly 10.

Each of the holder units 24-27 includes a generally U-shaped base assembly 33 which, in the present embodiment, includes a pair of "L" shaped members 34 and 35. The "L" shaped member 34 includes a bottom leg 36 having a longitudinal slot 37 defined therethrough and a vertical arm 38 extending upwardly from one end of the bottom leg 36. Similarly, the L shaped member 35 includes a bottom leg 39 which overlies the bottom leg 36. The bottom leg 39 defines a slot 40 which is complementary with the slot 37. A vertical arm 41 extends upwardly from one end of the bottom leg 39 in spaced relationship with the vertical arm 38. The vertical arms 38 and 41 are laterally adjustable with respect to one another. Referring to FIG. 2, a plurality of bolts 43 extend through the complementary slots 37 and 40. Upon loosening the nuts of the bolts 43, the arms 38 and 41 may be adjusted toward and away from one another, depending upon the size of the individual equipment units. Referring to FIG. 3, each of the vertical arms 38 and 41 also define vertically extending slots 44.

Each of the holder units 24, 25 and 26 includes a generally U-shaped top assembly 47, with the exception of the uppermost holder unit 27.

Referring to FIG. 2, each of the top assemblies 47 includes generally L shaped members 48 and 49. The L shaped member 48 includes a top leg 50 which defines a longitudinally extending slot 51 and a depending leg 52 which overlies the vertcial arm 38 of the U-shaped base assembly 33.

Similarly, the L shaped member 49 includes a top leg 54 defining a longitudinally extending slot 55 which is aligned with the slot 51. A depending leg 56 which is laterally spaced from the depending leg 52 extends downward from the top leg 54. The lateral spacing of the depending legs 52 and 56 are adjusted by releasing and tightening the bolts 43 as discussed above with respect to the vertical arms 38 and 41 of the base assembly 33. Referring to FIG. 3, the depending legs 52 and 56 also define vertical slots 58 which are in an aligned relationship with the vertical slots 44 of the base assemblies 33. Bolt assemblies 59 are positioned within the aligned slots 44 and 58 and the vertical spacing of one of the base assemblies 33 and its corresponding top assembly 47 is adjusted by releasing and tightening the bolt assemblies 59.

In the preferred embodiment, the deck assembly 21 is connected to the post 17 by a joint assembly 62. Referring to FIG. 5, the second end 22 of the post 17 is tubular in configuration and defines aligned openings 63 therethrough. The joint assembly 62 includes upper and lower mounting members 64 and 65 which define central openings 66 and 67, respectively. The central openings 66 and 67 are in an aligned relationship with the openings 63 in the post 17. The upper mounting member 64 defines a semi-cylindrical recess 68 and the lower mounting member 65 defines a complementary semi-cylindrical recess 69. As shown in FIG. 3, the complementary recesses 68 and 69 define a socket which receives the second end 22 of the post 17. A bolt 70 extends downward through the slots 37 and 40 in the lowest holder unit 24 and through the aligned openings 66, 63 and 67. In the lowermost holder unit 24, the bolt 70 performs the same function as the bolts 43 of the holder units 25-27, with respect to the lateral spacing of the vertical arms 38 and 41. A lock washer 71 and a nut 72 are placed on the lower end of the bolt 70. It has been found that the joint assembly 62 provides a very stable means of connecting the deck assembly 21 to the post 17.

Referring to FIG. 1, the equipment support assembly 10, according to the present invention, places the equipment units 28-31 at one central location which is convenient to the driver for safe vehicular operation. The vehicle operator who is wearing a safety belt or safety harness may easily operate the equipment units 28-31 without removing his safety equipment.

What we claim is:

1. An equipment support assembly, comprising, in combination, a mounting bracket defining a first generally vertical axis, a post having first and second ends, a generally vertical portion adjacent said first end and a generally horizontal portion adjacent said second end, said first end of said post being adjustably mounted on said mounting bracket for rotation about such first vertical axis, a deck assembly adjustably mounted adjacent said second end of said post for rotation about a second generally vertical axis, said deck assembly including at least one holder unit, said holder unit including a generally U-shaped base assembly having spaced vertical arms which are laterally adjustable.

2. An equipment support assembly, according to claim 1, including a joint assembly for mounting said deck assembly to said post.

3. An equipment support assembly, according to claim 2, wherein said second end of said post is tubular and defines aligned openings therethrough, said joint assembly comprising upper and lower mounting members, each of said mounting members defining a central opening coaxial with said aligned openings and having complementary semi-cylindrical recesses defined at its inner surface, said complementary recesses receiving said upper end of said post and bolt means extending through said aligned openings and said central openings for connecting said post to said deck assembly, said upper mounting member having a flat upper bearing surface for adjustably supporting said deck assembly.

4. An equipment support assembly according to claim 1, wherein said deck assembly includes a plurality of holder units positioned in vertical juxtaposition.

5. An equipment support assembly, according to claim 4, wherein at least the lowermost ones of said holder units include a U-shaped top assembly complementary with said U-shaped base assembly, said top assembly having spaced depending legs adjacent said vertical arms, said legs being laterally adjustable, whereby said base assembly and said top assembly may receive and hold a piece of equipment.

6. An equipment support assembly, according to claim 5, wherein said top assembly and said base assembly of the individual holder units are vertically adjustable with respect to one another.

7. An equipment support assembly, according to claim 6, wherein each of said U-shaped base assemblies comprise a pair of L shaped members, each of said L shaped members consisting of a bottom leg and one of said vertical arms extending upwardly from one end of said bottom leg, said bottom legs of said pair of L shaped members overlying one another, each of said bottom legs defining first complementary aligned slots and wherein each of said U-shaped top assemblies comprise a pair of L shaped members, each of said L shaped members consisting of a top leg and one of said depending legs extending downwardly from one end of said top leg, said top legs of said pair of L shaped members overlying one another, each of said top legs defining second complementary aligned slots and holding means adjacent said first and second complementary aligned slots for adjusting the spacing of said vertical arms and said depending legs.

8. An equipment support assembly, according to claim 7, wherein said adjacent depending legs and vertical arms define complementary adjusting openings and adjusting means positioned adjacent said complementary adjusting openings for adjusting the vertical spacing of said holder units.

9. An equipment support assembly comprising, in combination, a mounting bracket, a socket on said mounting bracket, said socket defining a first, generally vertical axis, a post having a generally vertical portion adjacent one end, a generally horizontal portion attached to said generally vertical portion and a second end on said generally horizontal portion, said one end of said post being adjustably positioned in said socket for rotation around said first axis, a deck assembly adjustably mounted adjacent said second end of said post, means for adjustably mounting said deck assembly to said second end of said post, said mounting means defining a second, generally vertical axis, said deck assembly including at least two holder units positioned in vertical juxtaposition, each of said holder units except the uppermost one consisting of a generally U-shaped base assembly having spaced vertical arms which are laterally adjustable and generally U-shaped top assembly having spaced depending legs which are laterally adjustable, said vertical arms being in a complementary overlying relationship with the respective depending legs and adjusting means on said respective overlying vertical arms and depending legs for adjusting the vertical spacing of said holder units.

10. An equipment support assembly comprising, in combination, a mounting bracket, a post connected to said mounting bracket, said post extending upwardly from said mounting bracket and a deck assembly mounted adjacent the upper end of said post, a joint assembly for mounting said deck assembly to said post, said upper end of said post being tubular and defining aligned openings therethrough, said joint assembly comprising upper and lower mounting members, each of said mounting members defining a central opening coaxial with said aligned openings and having complementary semi-cylindrical recesses defined at its inner surface, said complementary recesses receiving said upper end of said post and bolt means extending through said aligned openings and said central openings for connecting said post to said deck assembly, said deck assembly including at least one holder unit, said holder unit including a generally U-shaped base assembly having spaced vertical arms which are laterally adjustable, at least the lowermost ones of said holder units including a U-shaped top assembly complementary with said U-shaped base assembly, said top assembly having spaced depending legs adjacent said vertical arms, said legs being laterally adjustable, whereby said base assembly and said top assembly may receive and hold a piece of equipment, said top assembly and said base assembly of the individual holder units being vertically adjustable with respect to one another, each of said U-shaped base assemblies including a pair of L shaped members, each of said L shaped members consisting of a bottom leg and one of said vertical arms extending upwardly from one end of said bottom leg, said bottom legs of said pair of L shaped members overlying one another, each of said bottom legs defining first complementary aligned slots and wherein each of said U-shaped top assemblies comprise a pair of L shaped members, each of said L shaped member consisting of a top leg and one of said depending legs extending downwardly from one end of said top leg, said top legs of said pair of L shaped members overlying one another, each of said top legs defining second complementary aligned slots and holding means adjacent said first and second complementary aligned slots for adjusting the spacing of said vertical arms and said depending legs.

11. An equipment support assembly, according to claim 10, wherein said adjacent depending legs and vertical arms define complementary adjusting openings and adjusting means positioned adjacent said complementary adjusting openings for adjusting the vertical spacing of said holder units.

* * * * *